United States Patent
Zeng et al.

(10) Patent No.: US 12,212,761 B2
(45) Date of Patent: Jan. 28, 2025

(54) ENCODER AND ASSOCIATED SIGNAL PROCESSING METHOD

(71) Applicant: Realtek Semiconductor Corp., HsinChu (TW)

(72) Inventors: Weimin Zeng, Milpitas, CA (US); Chi-Wang Chai, Cupertino, CA (US); Wei Pu, Suzhou (CN); Wujun Chen, Suzhou (CN); Wei Li, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 239 days.

(21) Appl. No.: 18/107,021

(22) Filed: Feb. 8, 2023

(65) Prior Publication Data
US 2024/0267541 A1    Aug. 8, 2024

(51) Int. Cl.
*H04N 19/184* (2014.01)
*H04N 19/124* (2014.01)

(52) U.S. Cl.
CPC ......... *H04N 19/184* (2014.11); *H04N 19/124* (2014.11)

(58) Field of Classification Search
CPC .. H04N 19/124; H04N 19/176; H04N 19/184; H04N 19/186; H04N 19/96
USPC .................................................... 375/240.03
See application file for complete search history.

(56) References Cited

U.S. PATENT DOCUMENTS

| 5,047,852 | A * | 9/1991 | Hanyu | H04N 19/18 |
| | | | | 375/E7.184 |
| 2020/0045321 | A1* | 2/2020 | Thirumalai | H04N 19/167 |
| 2023/0232020 | A1* | 7/2023 | Zhang | H04N 19/139 |
| | | | | 375/240.13 |

FOREIGN PATENT DOCUMENTS

| TW | 201313032 A1 | 3/2013 |
| TW | 202015424 A | 4/2020 |

OTHER PUBLICATIONS

Jingning Han, "A Technical Overview of AV1", arXiv, Feb. 8, 2021.

* cited by examiner

*Primary Examiner* — Kathleen M Walsh
(74) *Attorney, Agent, or Firm* — Winston Hsu

(57) ABSTRACT

The present invention provides an encoder including a quantization circuit, a control circuit and an encoding circuit is disclosed. The quantization circuit is configured to generate quantized data corresponding to a CTU according to image data, wherein the CTU comprises at least one TU. The control circuit is configured to determine a number of allocated bits for each TU in the CTU, where the number of allocated bits for each TU is determined based on a sum of remaining bits of the TUs that have been encoded. The encoding circuit is configured to encode each TU to obtain encoded data according to the number of allocated bits of the TU in the CTU.

14 Claims, 5 Drawing Sheets

ENCODER AND ASSOCIATED SIGNAL PROCESSING METHOD

BACKGROUND OF THE INVENTION

1. Field of the Invention

The present invention relates to a video encoder.

2. Description of the Prior Art

In an encoder adopting an AV1 (AOMedia Video 1) video encoding format formulated by Alliance for Open Media (AOMedia), the purpose of bit rate control can be achieved by selecting a series of encoding parameters. Specifically, the encoder can determine an quantization parameter during encoding according to a target bit rate, model(s) of the encoding rate and the quantization parameter, so as to control the output bit rate of the encoder. However, since the number of bits of each coding tree unit (CTU) (or super-block) after encoding cannot be determined before encoding, the above-mentioned method of setting quantization parameters cannot guarantee that the target bit rate can be met, which causes problems in the bit rate control of the encoder.

SUMMARY OF THE INVENTION

It is therefore an objective of the present invention to provide an encoder and associated encoding method, which can ensure that the output bit rate of the encoder can meet the target bit rate, so as to solve the problems described in the prior art.

According to one embodiment of the present invention, an encoder comprising a quantization circuit, a control circuit and an encoding circuit is disclosed. The quantization circuit is configured to generate quantized data corresponding to a CTU according to image data, wherein the CTU comprises at least one transform unit (TU). The control circuit is configured to determine a number of allocated bits for each TU in the CTU, where the number of allocated bits for each TU is determined based on a sum of remaining bits of the TUs that have been encoded. The encoding circuit is configured to encode each TU to obtain encoded data according to the number of allocated bits of the TU in the CTU.

According to one embodiment of the present invention, a signal processing method comprises: generating quantized data corresponding to a CTU according to image data, wherein the CTU comprises at least one TU; determining a number of allocated bits for each TU in the CTU, where the number of allocated bits for each TU is determined based on a sum of remaining bits of the TUs that have been encoded; and encoding each TU to obtain encoded data according to the number of allocated bits of the TU in the CTU.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
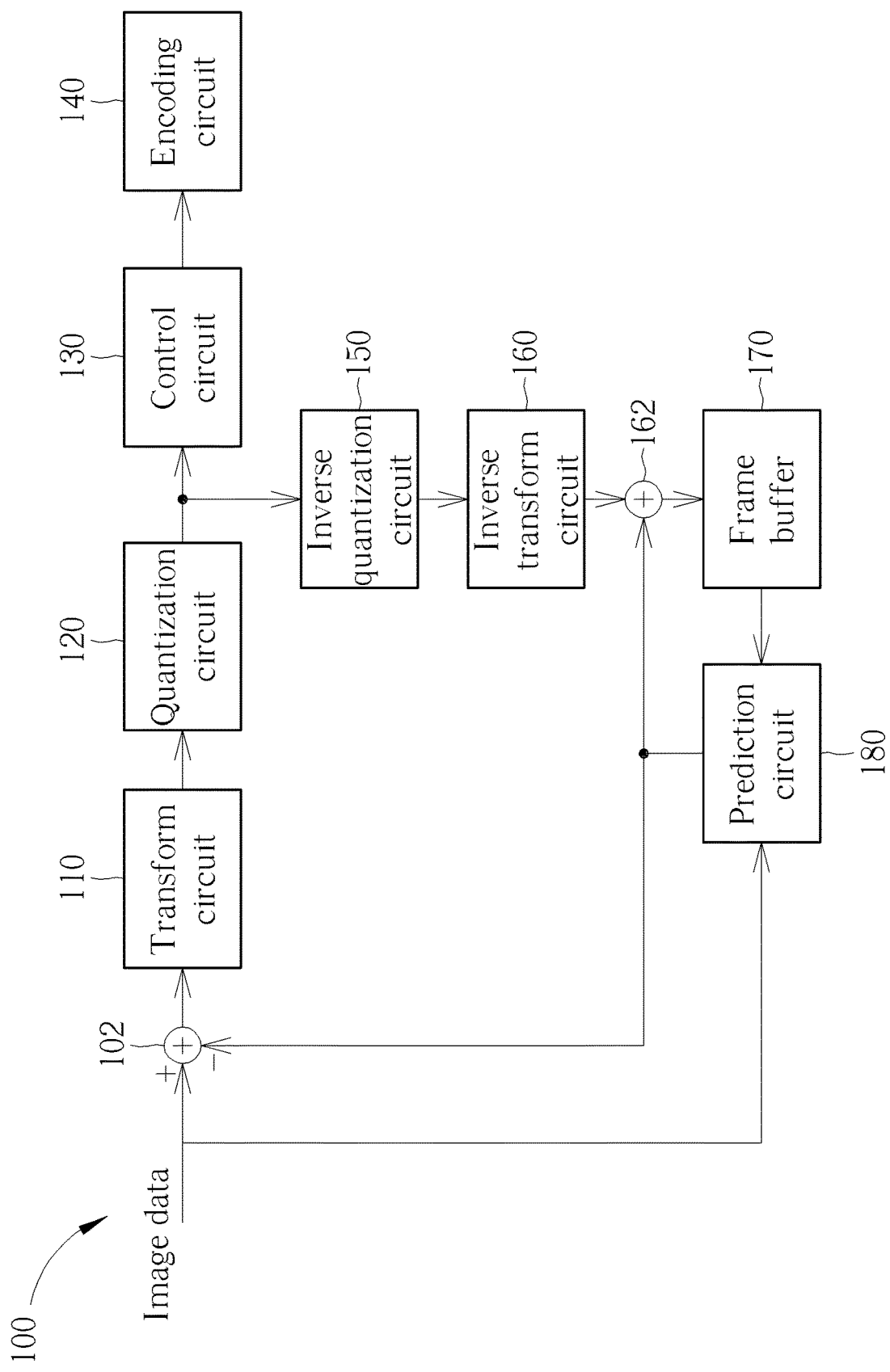
FIG. 1 is a diagram illustrating an encoder according to one embodiment of the present invention.

FIG. 1 is a diagram illustrating an encoder 100 according to one embodiment of the present invention. As shown in FIG. 1, the encoder 100 comprises a calculation circuit 102, a transform circuit 110, a quantization circuit 120, a control circuit 130, an encoding circuit 140, an inverse quantization circuit 150, an inverse transform circuit 160, a calculation circuit 162, a frame buffer 170 and a prediction circuit 180. In this embodiment, the encoder 100 supports the AV1 video coding format formulated by AOMedia.

In the main operation of the encoder 100, the prediction circuit 180 is arranged to receive external image data (e.g. the image frame) and an interpolated frame or adjusted image data that are generated inside the encoder 100, to generate predicted image data, and the calculation circuit 102 calculates a difference between the image data and the predicted image data generated by the prediction circuit 180 to obtain residual error data. Specifically, the prediction circuit 180 may be arranged to divide the received frame into multiple blocks, and perform inter-frame prediction, intra-frame prediction, motion estimation, and/or motion compensation upon the multiple blocks, to generate the predicted image data, for the calculation circuit 102 to calculate the residual error data corresponding to the multiple blocks. Then, the transform circuit 110 performs discrete cosine transform (DCT) upon the multiple residual error data, to transform the residual error data into frequency-domain data. Afterward, the quantization circuit 120 performs a quantization operation upon the frequency-domain data generated by the transform circuit 110, to generate quantized data, wherein the quantization operation of each frame corresponds to a quantization parameter. The encoding circuit 140 is arranged to process the quantized data to generate encoded data, and transmit the encoded data to a decoder (not shown) through the back-end channel. In addition, the inverse quantization circuit 150 is arranged to perform an inverse quantization operation upon the quantized data generated by the quantization circuit 120, and the inverse transform circuit 160 is arranged to perform an inverse transform operation (e.g. an inverse DCT) upon an output of the inverse quantization circuit 150, to generate an inverse transformed residual error data. Afterward, the calculation circuit 162 adds the inverse transformed residual error data generated by the inverse transform circuit 160 and the predicted image data generated by the prediction circuit 180 to generate adjusted image data, and stores the adjusted image data in the frame buffer 170 for use by the prediction circuit 180.

It is noted that, the operations of the calculation circuit 102, the transform circuit 110, the quantization circuit 120, the encoding circuit 140, the inverse quantization circuit 150, and the inverse transform circuit 160, the calculation circuit 162, the frame buffer 170 and the prediction circuit 180 in the encoder 100 are well known to those with ordinary skill in the art, and the focus of the present invention is on the control of the budget (bit budget) of each block by the control circuit 130 during compression. Therefore, the following content mainly describes the control circuit 130 and the encoding circuit 140.

Figure 2:
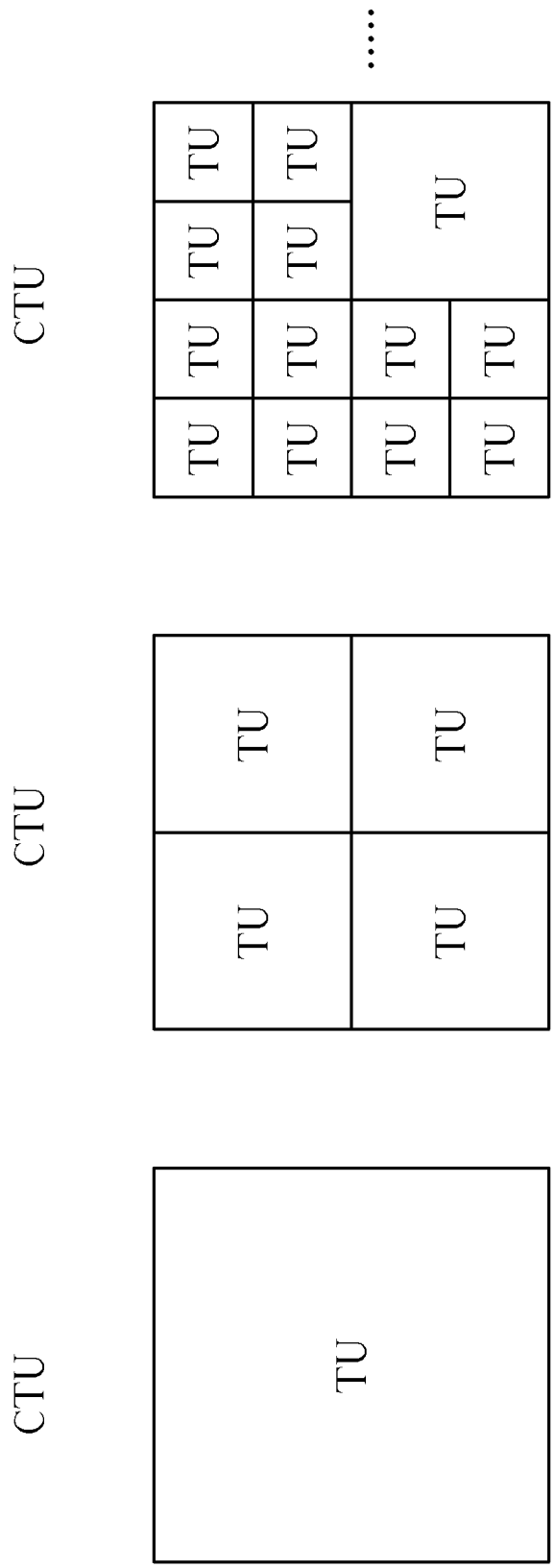
FIG. 2 is a diagram of a CTU divided into different numbers of TUs.

In the AV1 video coding format, a variety of coding units with different sizes are specified, wherein the largest coding unit can be called a coding tree unit (CTU) or a super block, and its size can be 128*128 pixels, 64*64 pixels or 32*32 pixels. In addition, the CTU itself can be divided into smaller transform units (TU). Taking a the CTU with 32*32 pixels shown in FIG. 2 as an example, the size of each TU divided in the CTU can be 32*32, 16*16, 16*8, 8*16, 8*8 pixels, . . . etc. In addition, for each CTU, the encoder 100 will try all division methods to determine the best TU division method for subsequent processing.

It should be noted that the various division methods of the CTU mentioned above, the determination of the best TU division method and related operations can refer to the paper "A Technical Overview of AV1" written by Jingning Han et al., so the following description is under the condition that the encoder 100 has determined the division method of CTU.

In this embodiment, according to the output bit rate set by the encoder 100, the control circuit 130 can determine the number of bits of each CTU after encoding, and the maximum number of bits of each TU in the CTU after encoding is sequentially adjusted according to multiple parameters, to achieve the purpose of effectively controlling the bit rate. Specifically, the control circuit 130 of this embodiment can set the following parameters for subsequent use:

TBL: a target number of bits of a CTU.

TBL_TU: a target number of bits for each TU in the CTU, where the target number of bits for each TU can be determined by a ratio of the TU to the CTU. For example, assuming that the size of the CTU is 32*32 pixels, the TBL is "10000", and the size of a TU is 16*16 pixels, since the TU is a quarter of the CTU, so its TBL_TU can be a quarter of TBL, that is, "2500".

BL_TU: the number of allocated bits for each TU in the CTU, where the number of allocated bits for the TU can be obtained by performing some specific strategies and calculations on TBL_TU.

minbits_TU: the ratio corresponding to a minimum target number of bits set by each TU. For example, assuming that minbits_TU is "0.8", the minimum number of bits of TU after encoding is "TBL_TU*0.8".

max_loan_budget: the number of bits that can be lent by the current CTU, that is, the number of bits that can be lent by all TUs in the CTU that have not yet been encoded, where the value of max_loan_budget will change with the processing of TUs in the CTU. For example, if all TUs of the CTU have not yet been encoded, then max_loan_budget is equal to "TBL*(1−minbits_TU)".

UBL_TU: the actual number of bits of the TU after being encoded by the encoding circuit 140.

acc_budget: the sum of the remaining bits of the TU after encoding. For example, for each encoded TU, the remaining bits are "BL_TU−UBL_TU" (which can be positive or negative), and "acc_budget" is the sum of the remaining bits of each encoded TU.

deflict_budget: the sum of max_loan_budget and acc_budget corresponding to the current TU.

bisfactor: the ratio of the target number of bits of each TU (TBL_TU) to the target number of bits of the CTU (TBL). For example, assuming that the size of the CTU is 32*32 pixels, for the five sizes of TU: 32*32, 16*16, 16*8, 8*16 and 8*8, the corresponding parameters "bisfactor" can be 1, (¼), (⅛), (⅛), (¹⁄₁₆), respectively.

minfactor: the ratio of the number of bits that each TU is allowed to lend to max_loan_budget to TBL_TU. For example, if minfactor is "0.1" and the target number of bits of TU (TBL_TU) is "2500", minfactor is equal to "250".

In one embodiment, "minfactor" can be set by the designer, and TUs with different sizes have different "minfactor", for example, for five sizes of TUs: 32*32, 16*16, 16*8, 8*16 and 8*8, the corresponding parameters "minfactor" can be 0, 0.1, 0.15, 0.15 and 0.2, respectively.

maxfactor: the maximum ratio of the number of bits that each TU is allowed to lend to max_loan_budget to TBL_TU, and the purpose of which is to balance the number of allocated bits for each TU (BL_TU). In one embodiment, "maxfactor" can be set by the designer, and TUs with different sizes have different "maxfactor", for example, for five sizes of TUs: 32*32, 16*16, 16*8, 8*16 and 8*8, the corresponding parameters "maxfactor" can be 0, 0.2, 0.3, 0.3 and 0.4, respectively.

In this embodiment, the control circuit 130 can determine the target number of bits and/or the number of allocated bits for each TU by using at least a part of the above parameters, wherein each TU can lend its own target number of bits to other TUs, and each TU can also borrow bits from other TUs to increase its own allocated bits according to part of above parameters such as max_loan_budget, acc_budget, minfactor, . . . etc. Therefore, the encoding operation can be efficiently completed.

Figure 3:
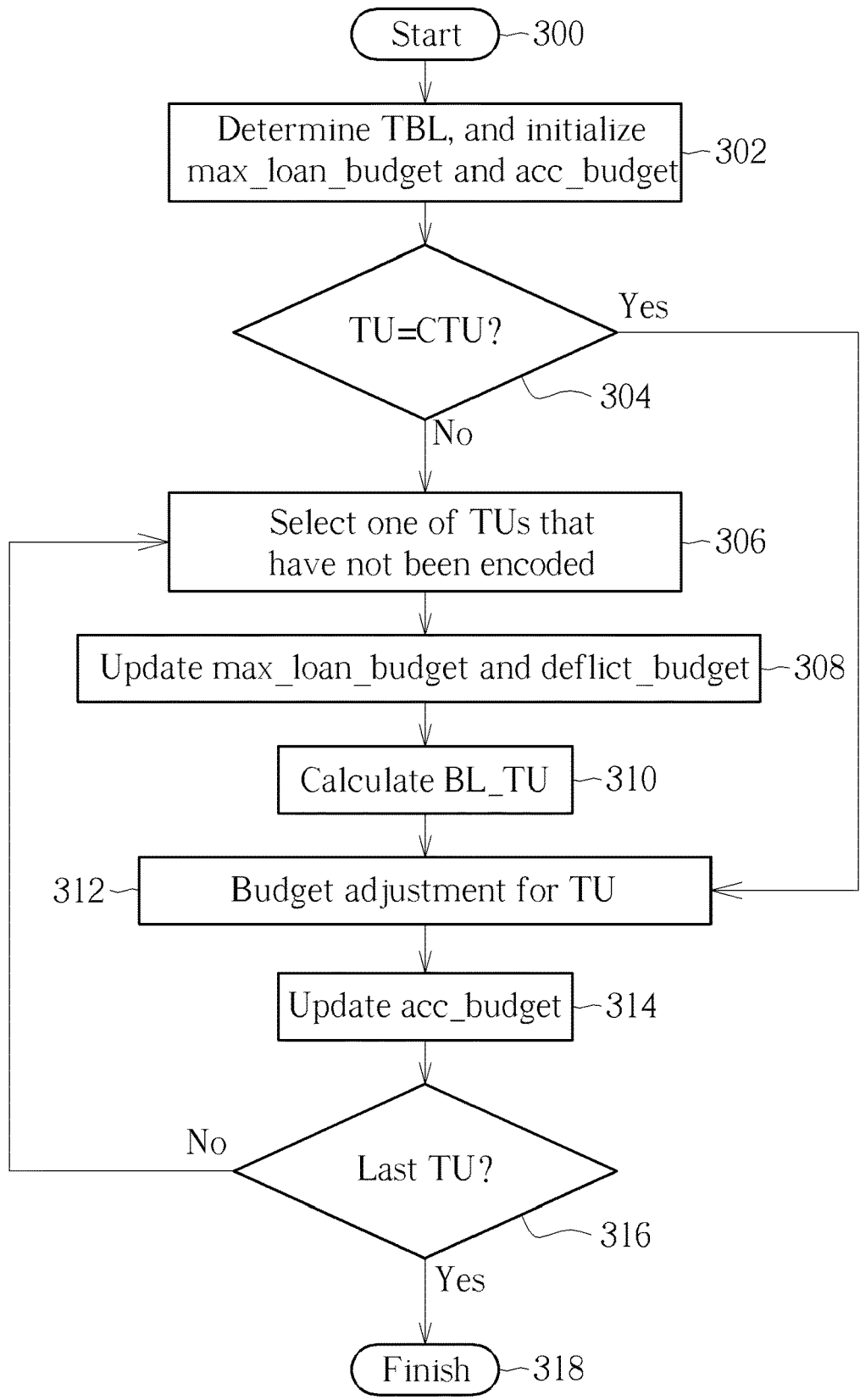
FIG. 3 is a flowchart of a method for processing a CTU according to one embodiment of the present invention.

FIG. 3 is a flowchart of a method for processing a CTU according to one embodiment of the present invention. In Step 300, the flow starts, the encoder 100 is processing a CTU, the encoder 100 has determined a best division method of the TUs in the CTU, and the quantization circuit 120 starts to process the TUs in the CTU to generate quantized data to the control circuit 130. In Step 302, the control circuit 130 determines the target bit number of the CTU (i.e., TBL), and initializes the parameters max_loan_budget and acc_budget. For example, assuming that the parameter minbits_TU is "0.8", the parameter max_loan_budget is equal to "0.2*TBL", and the parameter acc_budget is "0".

In Step 304, the control circuit 130 determines whether the size of the TU to be processed (hereinafter, the current TU) is equal to the size of the CTU, that is, whether the CTU is only divided into one TU. If yes, the flow enters Step 312; and if not, the flow enters Step 306.

In Step 306, the encoder 100 selects one of the TUs that have not been processed/encoded. In Step 308, the control circuit 130 updates the parameters max_loan_budget and deflict_budget, wherein when processing the first TU, deflict_budget is equal to max_loan_budget. In Step 310, the control circuit 130 calculates the number of allocated bits (BL_TU) of the current TU, wherein BL_TU can be determined according to the target number of bits of the current TU (TBL_BU) and the corresponding parameters max_loan_budget, acc_budget, and deflict_budget. For example, if acc_budget is less than or equal to "0", the control circuit 130 compares max_loan_budget with deflict_budget, and adds a smaller one to TBL_BU, to serve as the number of allocated bits of the current TU (BL_TU). If acc_budget is greater than "0", the control circuit 130 calculates the maximum number of bits that can borrow (named as "max_loan") based on the current TU's TBL_BU and maxfactor, and compares max_loan_budget with deflict_budget, and selects a smaller one to serve as an offset value. Afterwards, the control circuit 130 compares the offset value with acc_budget, and selects a larger one to serve as an updated offset value. Then, the control circuit 130 compares the updated offset value with max_loan, and adds the smaller one to TBL_BU, to serve as the number of allocated bits of the current TU (BL_TU). It is noted that the above calculation for BL_TU is only used as an example, rather than a limitation of the present invention In Step 312, the encoding circuit 140 encodes the TU, and the control circuit 130 adjusts the budget (bit budget) of the TU according to the operation of the encoding circuit 140. Specifically, since the quantized data generated by the quantization circuit 120 includes information of multiple components in the color space, for example, the luminance component (i.e., Y component) of the YUV color space and two chrominance components (i.e., U component and V component), and the BL_TU determined in step S310 is the number of bits shared by the multiple components, the control circuit 130 can further process each component in the TU to efficiently encode each component. For the convenience of description, the following multiple components are Y component, U component and V component in the YUV color space.

Figure 4:
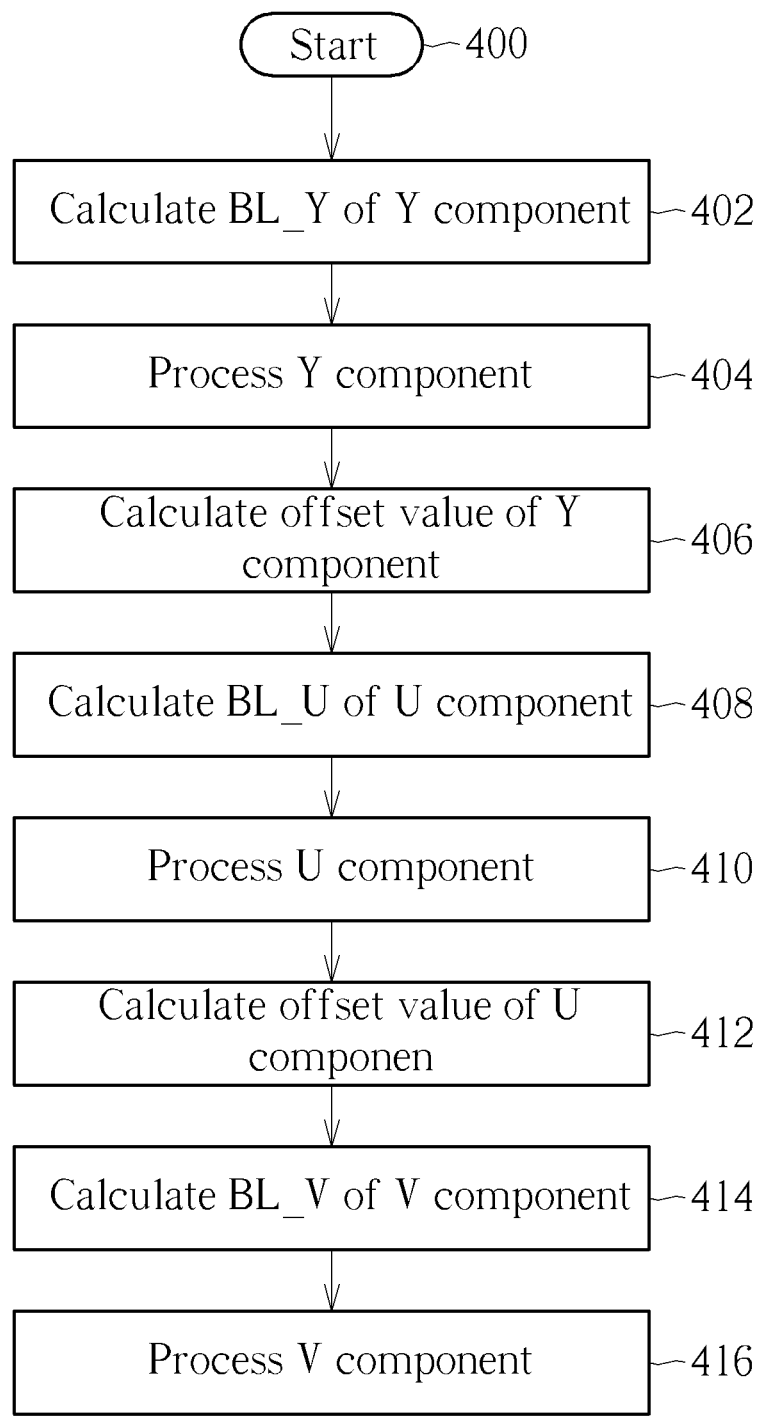
FIG. 4 is a flowchart of a method for adjusting the budget of TU according to one embodiment of the present invention.

FIG. 4 is a flowchart of a method for adjusting the budget of TU according to one embodiment of the present invention. In Step 400, the flow starts. In Step 402, the control circuit 130 calculates an allocated number of bits of the Y component. For example, the Y component, U component and V component can correspond to different ratios, such as 0.4, 0.3 and 0.3, and the control circuit 130 can multiply BL_TU of the TU by the ratio corresponding to the Y component to obtain the number of allocated bits of the Y component (hereinafter "BL_Y").

In Step 404, the control circuit 130 and the encoding circuit 140 process the Y component. In detail, the quantized data generated by the quantization circuit 120 will be converted into a coefficient sequence, wherein for the encoding circuit 140, the position of the last non-zero coefficient of the coefficient sequence will greatly affect the number of encoded bits. Therefore, in the process of encoding the coefficient sequence by the encoding circuit 140, the control circuit 130 will calculate the current accumulated number of bits, and when the accumulated number of bits reaches BL_Y, the control circuit 130 sets the accumulated number equal to BL_Y as the position of the last non-zero coefficient of the coefficient sequence. That is, the control circuit 130 sets all subsequent coefficients to "0" to complete the truncation operation of the coefficient sequence, to achieve the purpose of limiting the number of bits of the encoded data generated by the coefficient sequence after encoding.

In Step 406, the control circuit 130 calculates the offset value of the Y component. For example, the control circuit 130 may subtract the encoded data of the Y component from BL_Y to generate the offset value of the Y component.

In Step 408, the control circuit 130 calculates the number of allocated bits of the U component. For example, the control circuit 130 can multiply the BL_TU of the TU by the ratio corresponding to the U component, and add the offset value of the Y component, to obtain the number of allocated bits of the U component (hereinafter, "BL_U").

In Step 410, the control circuit 130 and the encoding circuit 140 process the U component. In detail, in the process of encoding a coefficient sequence of the U component by the encoding circuit 140, the control circuit 130 will calculate the current accumulated number of bits, and when the accumulated number of bits reaches BL_U, the control circuit 130 sets the accumulated number equal to BL_U as the position of the last non-zero coefficient of the coefficient sequence. That is, the control circuit 130 sets all subsequent coefficients to "0" to complete the truncation operation of the coefficient sequence, to achieve the purpose of limiting the number of bits of the encoded data generated by the coefficient sequence after encoding.

In Step 412, the control circuit 130 calculates the offset value of the U component. For example, the control circuit 130 may subtract the encoded data of the U component from BL_U to generate the offset value of the U component.

In Step 414, the control circuit 130 calculates the number of allocated bits of the V component. For example, the control circuit 130 can multiply the BL_TU of the TU by the ratio corresponding to the V component, and add the offset value of the U component, to obtain the number of allocated bits of the V component (hereinafter, "BL_V").

In Step 416, the control circuit 130 and the encoding circuit 140 process the V component. In detail, in the process of encoding a coefficient sequence of the V component by the encoding circuit 140, the control circuit 130 will calculate the current accumulated number of bits, and when the accumulated number of bits reaches BL_V, the control circuit 130 sets the accumulated number equal to BL_V as the position of the last non-zero coefficient of the coefficient sequence. That is, the control circuit 130 sets all subsequent coefficients to "0" to complete the truncation operation of the coefficient sequence, to achieve the purpose of limiting the number of bits of the encoded data generated by the coefficient sequence after encoding.

Then, the flow goes to Step 314 of FIG. 3, after all components of the TU are processed, the control circuit 130 updates acc_budget according to the number of remaining bits of the TU.

In Step 316, the control circuit 130 determines whether the current TU is the last TU of the CTU, if yes, the flow enters Step 318 to complete the encoding operation of the CTU; and if not, the flow goes back to Step 306 to process the next TU of the CTU.

Figure 5:
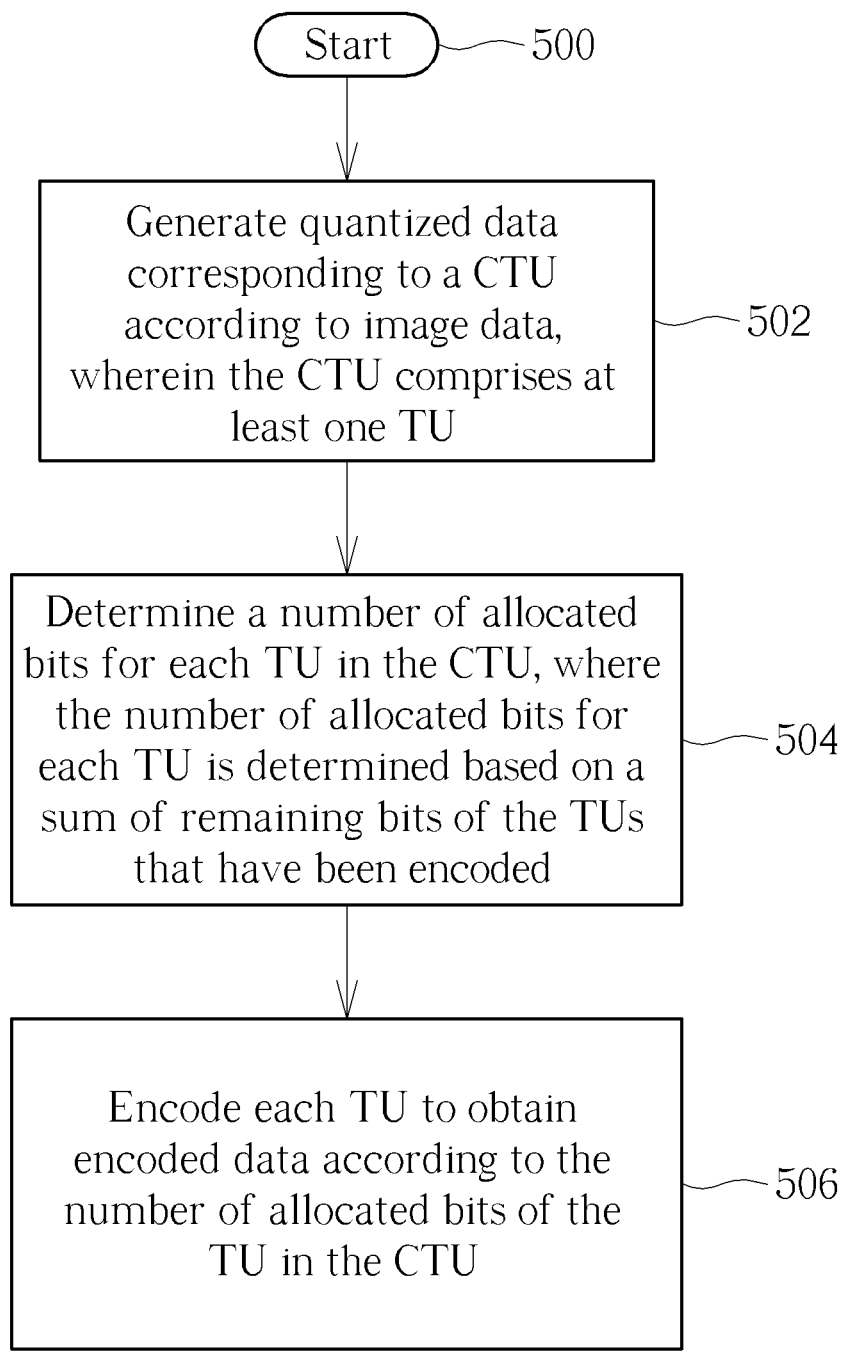
FIG. 5 is a flowchart of a signal processing method of an encoder according to one embodiment of the present invention.

FIG. 5 is a flowchart of a signal processing method of an encoder according to one embodiment of the present invention. Referring to the above embodiments shown in FIG. 1-FIG. 4, the flow is described as follows.

Step 500: the flow starts.

Step 502: generate quantized data corresponding to a CTU according to image data, wherein the CTU comprises at least one TU.

Step 504: determine a number of allocated bits for each TU in the CTU, where the number of allocated bits for each TU is determined based on a sum of remaining bits of the TUs that have been encoded.

Step 506: encode each TU to obtain encoded data according to the number of allocated bits of the TU in the CTU.

Briefly summarized, in the encoder and related operations, the target number of bits and/or the number of allocated bits for each TU when encoding is determined by allocating the number of bits to each TU in the CTU. Each TU can lend its own target number of bits to other TUs, or borrow bits from other TUs to increase its own allocated number of bits. Therefore, the encoding operation can be efficiently completed while effectively controlling the number of output bits of the encoder.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An encoder, comprising:
   a quantization circuit, configured to generate quantized data corresponding to a coding tree unit (CTU) according to image data, wherein the CTU comprises at least one transform unit (TU);
   a control circuit, configured to determine a number of allocated bits for each TU in the CTU, where the number of allocated bits for each TU is determined based on a sum of remaining bits of the TUs that have been encoded; and
   an encoding circuit, configured to encode each TU to obtain encoded data according to the number of allocated bits of the TU in the CTU.

2. The encoder of claim 1, wherein the CTU comprises a plurality of TUs, and for a current TU of the plurality of TUs, the control circuit determines the number of allocated bits of the current TU according to the sum of the remaining bits of the TUs that have been encoded and a minimum target number of bits of each TU that have not yet been encoded.

3. The encoder of claim 2, wherein for the current TU, the control circuit determines a target number of bits of the current TU according to a ratio of the current TU to the CTU; and the control circuit determines the number of allocated bits of the current TU according to the target number of bits of the current TU, the sum of the remaining bits of the TUs that have been encoded and the minimum target number of bits of each TU that have not yet been encoded.

4. The encoder of claim 3, wherein for the current TU, the control circuit determines a number of bits that the current TU is allowed to lend to the TUs that have not yet been encoded according to the ratio of the current TU to the CTU; and the control circuit determines the number of allocated bits of the current TU according to the target number of bits of the current TU, the number of bits that the current TU is allowed to lend to the TUs that have not yet been encoded, and the minimum target number of bits of each TU that have not yet been encoded.

5. The encoder of claim 2, wherein the control circuit adjusts a budget of the current TU according to the operation of the encoding circuit, so as to determine numbers of allocated bits of a plurality of components of a color space of the current TU.

6. The encoder of claim 5, wherein the color space comprises a first component and a second component, and the control circuit determines the allocated number of bits of the first component according to the allocated number of bits of the TU; and the encoding circuit encodes the first component to generate encoded data corresponding to the first component, and calculates a difference between the number of allocated bits of the first component and the encoded data corresponding to the first component to generate an offset value of the first component; and the encoding circuit determines the number of allocated bits of the second component according to the number of allocated bits of the current TU and the offset value of the first component.

7. The encoder of claim 6, wherein the color space further comprises a third component, the encoding circuit encodes the second component to generate encoded data corresponding to the second component, and calculates a difference between the number of allocated bits of the second component and the encoded data corresponding to the second component to generate an offset value of the second component; and the encoding circuit determines the number of allocated bits of the third component according to the number of allocated bits of the current TU and the offset value of the second component.

8. A signal processing method, comprising:
   generating quantized data corresponding to a coding tree unit (CTU) according to image data, wherein the CTU comprises at least one transform unit (TU);
   determining a number of allocated bits for each TU in the CTU, where the number of allocated bits for each TU is determined based on a sum of remaining bits of the TUs that have been encoded; and
   encoding each TU to obtain encoded data according to the number of allocated bits of the TU in the CTU.

9. The signal processing method of claim 8, wherein the CTU comprises a plurality of TUs, and the step of determining the number of allocated bits for each TU in the CTU comprises:
   for a current TU of the plurality of TUs, determining the number of allocated bits of the current TU according to the sum of the remaining bits of the TUs that have been encoded and a minimum target number of bits of each TU that have not yet been encoded.

10. The signal processing method of claim 9, wherein the step of determining the number of allocated bits for each TU in the CTU comprises:
    for the current TU, determining a target number of bits of the current TU according to a ratio of the current TU to the CTU; and
    determining the number of allocated bits of the current TU according to the target number of bits of the current TU, the sum of the remaining bits of the TUs that have been encoded and the minimum target number of bits of each TU that have not yet been encoded.

11. The signal processing method of claim 10, wherein the step of determining the number of allocated bits for each TU in the CTU comprises:
    for the current TU, determining a number of bits that the current TU is allowed to lend to the TUs that have not yet been encoded according to the ratio of the current TU to the CTU; and
    determining the number of allocated bits of the current TU according to the target number of bits of the current TU, the number of bits that the current TU is allowed to lend to the TUs that have not yet been encoded, and the minimum target number of bits of each TU that have not yet been encoded.

12. The signal processing method of claim 9, wherein the step of determining the number of allocated bits for each TU in the CTU comprises:
    adjusting a budget of the current TU according to the encoding operation, so as to determine numbers of allocated bits of a plurality of components of a color space of the current TU.

13. The signal processing method of claim 12, wherein the color space comprises a first component and a second component, and the step of adjusting the budget of the current TU according to the encoding operation, so as to determine the numbers of allocated bits of the plurality of components of the color space of the current TU comprises:
    determining the allocated number of bits of the first component according to the allocated number of bits of the TU;
    encoding the first component to generate encoded data corresponding to the first component, and calculating a difference between the number of allocated bits of the first component and the encoded data corresponding to the first component to generate an offset value of the first component; and determining the number of allocated bits of the second component according to the number of allocated bits of the current TU and the offset value of the first component.

14. The signal processing method of claim 13, wherein the color space further comprises a third component, and the step of adjusting the budget of the current TU according to the encoding operation, so as to determine the numbers of allocated bits of the plurality of components of the color space of the current TU comprises:

encoding the second component to generate encoded data corresponding to the second component, and calculating a difference between the number of allocated bits of the second component and the encoded data corresponding to the second component to generate an offset value of the second component; and determining the number of allocated bits of the third component according to the number of allocated bits of the current TU and the offset value of the second component.

* * * * *